US012612534B2

(12) United States Patent (10) Patent No.: US 12,612,534 B2
Jansen et al. (45) Date of Patent: Apr. 28, 2026

(54) RADICAL-CURABLE COMPOSITION

(71) Applicant: Covestro (Netherlands) B.V., Geleen (NL)

(72) Inventors: Johan Franz Gradus Antonius Jansen, Geleen (NL); Erik-Jan van den Biggelaar, Raamsdonksveer (NL)

(73) Assignee: Covestro (Netherlands) B.V., Geleen (NL)

( * ) Notice: Subject to any disclaimer, the term of this patent is extended or adjusted under 35 U.S.C. 154(b) by 109 days.

(21) Appl. No.: 18/700,891

(22) PCT Filed: Oct. 25, 2022

(86) PCT No.: PCT/EP2022/079696
§ 371 (c)(1),
(2) Date: Apr. 12, 2024

(87) PCT Pub. No.: WO2023/072891
PCT Pub. Date: May 4, 2023

(65) Prior Publication Data
US 2024/0409772 A1 Dec. 12, 2024

(30) Foreign Application Priority Data

Oct. 29, 2021 (EP) ..................................... 21205559

(51) Int. Cl.
| | |
|---|---|
| *C09D 175/14* | (2006.01) |
| *C08G 18/48* | (2006.01) |
| *C08G 18/67* | (2006.01) |
| *C08G 18/75* | (2006.01) |
| *C08K 5/06* | (2006.01) |
| *C09D 7/63* | (2018.01) |

(52) U.S. Cl.
CPC ....... *C09D 175/14* (2013.01); *C08G 18/4825* (2013.01); *C08G 18/672* (2013.01); *C08G 18/755* (2013.01); *C08K 5/06* (2013.01); *C09D 7/63* (2018.01)

(58) Field of Classification Search
None
See application file for complete search history.

(56) References Cited

U.S. PATENT DOCUMENTS

| | | | | |
|---|---|---|---|---|
| 4,169,167 A | * | 9/1979 | McDowell ........... | B41M 7/0081 |
| | | | | 427/494 |
| 4,324,744 A | | 4/1982 | Lechtken et al. | |
| 4,603,162 A | * | 7/1986 | Hasegawa ............ | C09D 11/101 |
| | | | | 524/404 |
| 4,737,593 A | | 4/1988 | Ellrich et al. | |

| | | | | |
|---|---|---|---|---|
| 4,942,001 A | * | 7/1990 | Murphy .................. | B29C 35/08 |
| | | | | 522/182 |
| 5,534,559 A | | 7/1996 | Leppard et al. | |
| 5,585,415 A | * | 12/1996 | Gorzalski ................ | C09D 4/00 |
| | | | | 522/18 |
| 5,942,290 A | | 8/1999 | Leppard et al. | |
| 6,020,528 A | | 2/2000 | Leppard et al. | |
| 6,020,529 A | | 2/2000 | Fremy | |
| 6,048,660 A | | 4/2000 | Leppard et al. | |
| 6,399,670 B1 | * | 6/2002 | MacQueen .............. | C09D 7/67 |
| | | | | 522/182 |
| 6,486,226 B2 | | 11/2002 | Al-Akhdar et al. | |
| 6,486,228 B2 | | 11/2002 | Kohler et al. | |
| 6,596,445 B1 | | 7/2003 | Matsumoto et al. | |

(Continued)

FOREIGN PATENT DOCUMENTS

| | | |
|---|---|---|
| CN | 102190938 B | 4/2013 |
| JP | 2019065245 A | 4/2019 |

(Continued)

OTHER PUBLICATIONS

International Search Report, PCT/EP2022/079696, date of mailing: Feb. 7, 2023, Authorized officer: M. Alevizopoulou.

*Primary Examiner* — Sanza L. Mcclendon
(74) *Attorney, Agent, or Firm* — Donald R. Palladino

(57) ABSTRACT

The present invention is directed to a radical-curable coating composition comprising
    (A) One or more oligomers selected from the group consisting of urethane (meth)acrylates, (meth)acrylated epoxidized triglycerides and any mixture thereof, wherein said oligomers have a molar mass equal to or higher than 800 g/mol and lower than 4500 g/mol,
    (B) One or more methacrylate reactive diluents having a molar mass lower than 800 g/mol, wherein said methacrylate reactive diluents have an average methacrylate functionality higher than 2,
    (C) One or more acrylate reactive diluents having a molar mass lower than 800 g/mol, wherein said acrylate reactive diluents have an average acrylate functionality higher than 2,
    (D) One or more photo-initiators, and
    (E) One or more thermal initiators,
wherein the acrylate functionalities of the acrylate reactive diluents (C) and the methacrylate functionalities of the methacrylate reactive diluents (B) are present in a molar ratio of the acrylate functionalities to the methacrylate functionalities of at least 0.2,
wherein the amount of oligomers (A) is higher than 20 wt. % and lower than 90 wt. % and the amount of reactive diluents (B) and (C) is higher than 10 wt. % and lower than 80 wt. %, based on the total amount of (A), (B) and (C), and
wherein the total amount of (A), (B) and (C) is at least 25 wt. % of the radical-curable coating composition.

20 Claims, 1 Drawing Sheet

(56)     References Cited

U.S. PATENT DOCUMENTS

| | | | | |
|---|---|---|---|---|
| 6,852,771 B2 * | 2/2005 | Balch | .................... | C09D 175/16 |
| | | | | 427/508 |
| 7,169,826 B2 | 1/2007 | Sitzmann et al. | | |
| 8,092,858 B2 * | 1/2012 | Smith | .................. | G02B 6/2852 |
| | | | | 156/45 |
| 9,708,442 B1 | 7/2017 | Lee et al. | | |
| 10,125,259 B2 * | 11/2018 | Yokobori | ............. | C09D 11/101 |
| 11,389,276 B2 * | 7/2022 | Parkar | ................... | B29C 64/393 |
| 2001/0038910 A1 * | 11/2001 | MacQueen | .............. | C09D 7/65 |
| | | | | 428/327 |
| 2007/0191505 A1 * | 8/2007 | Takahashi | ............ | C08G 18/672 |
| | | | | 522/178 |
| 2019/0284430 A1 * | 9/2019 | Sigel | ........................ | C09D 7/63 |
| 2021/0179767 A1 | 6/2021 | Cappelle et al. | | |
| 2021/0361389 A1 * | 11/2021 | Mac Murray | ............ | A61C 7/08 |

FOREIGN PATENT DOCUMENTS

| | | | | | |
|---|---|---|---|---|---|
| KR | 20200069725 A | * | 6/2020 | ............... | C09D 7/40 |
| KR | 102155180 B1 | * | 9/2020 | ............... | C09J 4/00 |
| WO | 0147726 A1 | | 7/2001 | | |

* cited by examiner

RADICAL-CURABLE COMPOSITION

CROSS-REFERENCE TO RELATED APPLICATION

This application is a national stage application under 35 U.S.C. § 371 of PCT/EP2022/079696, filed Oct. 25, 2022, which claims the benefit of European Application No. 21205559.4, filed Oct. 29, 2021, each of which being incorporated herein by reference.

FIELD

The present invention relates to radical-curable coating compositions suitable for coating a substrate. The present invention further relates to a method for obtaining a coated substrate. The present invention also relates to an object comprising the coated substrate.

BACKGROUND

Radical-curable coating compositions have long been used to produce coatings having desired coating characteristics. For example coating compositions are used to protect surfaces from the environment, to conceal surface irregularities, to provide a surface which is more receptive to further treatment, or to enhance the surface appearance. A particular category of surface coatings is that of radiation-curable coating compositions polymerizable by e-beam or by ultraviolet radiation (UV). In general the cross-linking mechanism involves the use of actinic sources or ultraviolet radiation lamps (UV). UV lamp-induced cross-linking surface coatings may contain solvents, water and other coalescing substances in their formulation, or be characterized by a 100% solids content when their viscosity is adjusted by the addition of reactive diluents. The absence of volatile compounds such as water or volatile organic solvents results in that the applied coating thickness of coating systems having a 100% solids content only slightly reduces during the curing process. These coating can be beneficially applied directly onto many substrates yielding varies surfaces like high gloss surfaces but also matt surfaces can be obtained. For example, WO0147726 describes a method to finish panels with a printed décor layer with a UV curable coating composition to obtain a wear resistant translucent coating on the printed décor layer.

An area in which the radiation curable coatings perform less are coatings which undergo a subsequent heat treatment. Examples of such a heat treatment can be during a lamination process, in which the coated substrate is laminated onto another sheet, which generally uses high temperatures during a short period of time, or during an embossing step, in which at higher temperatures a structure or pattern is applied into the coated substrate. Processing conditions like temperatures going up to 220° C. during a time period of 60 sec are not exceptional.

These processes, using high temperatures and pressure might result in delamination or cracking of the radiation cured coating. Also the formation of blisters and other surface defects can occur.

SUMMARY

Consequently there is a need for improved radiation curable coating compositions which can undergo radiation cure followed by the thermal process, like lamination or embossing, while a good surface quality at the end of this 2 step process can be obtained. The object of this invention is to provide such coating compositions.

According to the invention, there is provided a radical-curable liquid coating composition, suitable for being subjected to photo-curing followed by thermal curing, which composition comprises
- (A) One or more oligomers selected from the group consisting of urethane (meth)acrylates, (meth)acrylated epoxidized triglycerides and any mixture thereof, wherein said oligomers have a molar mass equal to or higher than 800 g/mol and lower than 4500 g/mol,
- (B) One or more methacrylate reactive diluents having a molar mass lower than 800 g/mol, wherein said methacrylate reactive diluents have an average methacrylate functionality higher than 2,
- (C) One or more acrylate reactive diluents having a molar mass lower than 800 g/mol, wherein said acrylate reactive diluents have an average acrylate functionality higher than 2,
- (D) One or more photo-initiators, and
- (E) One or more thermal initiators, and wherein the acrylate functionalities of the acrylate reactive diluents (C) and the methacrylate functionalities of the methacrylate reactive diluents (B) are present in a molar ratio of the acrylate functionalities to the methacrylate functionalities of at least 0.2, wherein the amount of oligomers (A) is at least 20 wt. % and at most 90 wt. % and the amount of reactive diluents (B) and (C) is at least 10 wt. % and at most 80 wt. %, based on the total amount of (A), (B) and (C), and wherein the total amount of (A), (B) and (C) is at least 25 wt. % of the radical-curable coating composition.

DESCRIPTION

It has surprisingly been found that the inventive coating compositions can undergo radiation cure followed by thermal cure, while a good surface quality at the end of this 2 step process can be obtained. Surprisingly, it has been found that the partially cured coating obtained by photo-curing of the inventive coating composition is still flexible enough to allow embossing or deformation in a subsequent thermal treatment, such as for example hot pressing, without breaking or cracking of the partially cured coating, but is already dry enough to allow further handling, such as for example rolling up the substrate containing the partially cured coating to facilitate storage and/or transport, of the substrate containing the partially cured coating, while the coating obtained by thermally curing of the UV cured coating has a good surface quality and preferably also has good stain resistance, such as coffee resistance, and is hard enough to allow stacking and packing preferably without causing scratches.

As used herein, the molar mass of a compound is the calculated molar mass. The calculated molar mass is obtained by adding the atomic masses of all atoms present in the structural formula of a compound. When the exact structural formula of a compound is not known, for example for oligomer (A) when the exact structural formula of a reactant used to prepare oligomer (A) is not known, the molar mass of the compound is the number average molecular weight determined using Triple Detection Size Exclusion Chromatography using tetrahydrofuran THF as eluent.

As used herein the term (meth)acrylate means acrylate or methacrylate. As used herein, a (meth)acrylate reactive diluent is a compound having a molar mass lower than 800 g/mol and with at least one (meth)acrylate functionality. As used herein, the (meth)acrylate functionality of a compound is the number of (meth)acrylate functional groups per molecule of the compound.

An acrylate functional group has the following formula:

$$CH_2=CH-C(O)O-$$

A methacrylate functional group has the following formula:

$$CH_2=C(CH_3)-C(O)O-$$

The expression "in the range of from . . . to . . . " and the expression "from . . . to . . . " is understood as including the limits cited and also all the intermediate values.

Oligomer(s) (A)

The inventive radical-curable coating composition comprises one or more oligomers (A) selected from the group consisting of urethane (meth)acrylates, (meth)acrylated epoxidized triglycerides and any mixture thereof, wherein the oligomers have a molar mass equal to or higher than 800 g/mol and lower than 4500 g/mol.

Said (meth)acrylated epoxidized triglycerides are generally prepared via the reaction of (meth)acrylic acid with epoxidized triglycerides. Epoxidized triglycerides can be found in natural oils, such as Vernonia plant oil, or can be synthesized from more common unsaturated oils, such as for example soybean oil or linseed oil, via an epoxidation reaction.

The natural epoxy oil, vernonia oil, has a functionality of 2.8 epoxy rings per triglyceride. Commercially available epoxidized soybean oil is generally sold with a functionality of 4.1-4.6 epoxy rings per triglyceride, which can be identified via $^1$H NMR. Epoxidized linseed oil is also commercially available when higher epoxy content is required. The reaction of (meth)acrylic acid with epoxidized triglycerides like epoxidized soybean oil occurs through a standard substitution reaction and depends both on the epoxy as well as the (meth)acrylic acid concentration. Depending on the amount of (meth)acrylic acid used and the type of epoxidized triglyceride, (meth)acrylate functionalities ranging from 2 up to 5 or even 6 can readily be achieved. Some commercial examples of acrylated epoxidized triglycerides are Ebecryl® 860 and AgiSyn™ 2020.

Mixtures of various oligomeric urethane (meth)acrylates and (meth)acrylated epoxidized triglycerides can also be used.

Preferably, said one or more oligomers (A) have a molar mass higher than 850 g/mol, more preferably higher than 900 g/mol, even more preferably higher than 950 g/mol. Preferably, said one or more oligomers (A) have a molar mass lower than 4000 g/mol, more preferably lower than 3500 g/mol, even more preferably lower than 3000 g/mol.

Said one or more oligomers (A) are preferably urethane (meth)acrylates, even more preferably urethane acrylates.

Said oligomeric urethane (meth)acrylates (A) are preferably the reaction product of at least i) at least one organic polyisocyanate,
ii) at least one organic isocyanate-reactive polyol,
iii) a hydroxyl group containing (meth)acrylate compound.

The polyisocyanate compound i) used to prepare the urethane (meth)acrylate is preferably a diisocyanate compound. Preferably, the diisocyanate compound comprises, consists essentially of, or consists of isophorone diisocyanate, 2,4-toluene diisocyanate, 2,6-toluene diisocyanate, 2,4- and/or 4,4'-methylenedicyclohexyl diisocyanate, methylenediphenyl diisocyanate, tetramethylxylene diisocyanate, (hydrogenated) xylylene diisocyanate, 1,5-pentane diisocyanate, 2,2,4-trimethyl-hexamethylene diisocyanate, 2,4,4-trimethyl-hexamethylene diisocyanate, or hexamethylene diisocyanate, or mixtures thereof. Examples of suitable polyol compounds ii) to prepare the urethane (meth)acrylate include polyether polyols, polyester polyols, polycarbonate polyols, polycaprolactone polyols, acrylic polyols, and other polyols. These polyols may be used either individually or in combinations of two or more. The hydroxyl-group containing (meth)acrylate compound iii) used to prepare the urethane (meth)acrylate are for example 2-hydroxyethyl (meth)acrylate, 2-hydroxypropyl (meth)acrylate, pentaerythritol tri (meth)acrylate, dipentaerythritol penta(meth)acrylate, trimethylolpropane di(meth)acrylate, glyceroldi(meth)acrylate, and ethoxylated and/or propoxylated versions of these compounds and any mixture thereof. Some commercial examples of suitable urethane (meth)acrylates are AgiSyn™ 230A2, AgiSyn™ 230T1, AgiSyn™ 298, AgiSyn™ 242, AgiSyn™ U60, AgiSyn™ 670T1, NeoRad™ U-25, NeoRad™ U-65, Ebecryl® 4101, Ebecryl® 4666 and Ebecryl® 8296.

Said one or more oligomers (A) are present in the inventive radical-curable coating composition in an amount higher than 20 wt. % and lower than 90 wt. %, based on the total amount of (A), (B) and (C). Said one or more oligomers (A) are preferably present in the inventive radical-curable coating composition in an amount of at least 25 wt. %, preferably at least 30 wt. %, more preferably at least 40 wt. %, and preferably in an amount of at most 85 wt. %, more preferably at most 80 wt. %, even more preferably at most 75 wt. %, based on the total amount of (A), (B) and (C).

Next to the oligomers (A) as defined herein, other (meth)acrylate functional oligomers might be present as well. Examples of such other (meth)acrylate functional oligomers are epoxy (meth)acrylates and polyester (meth)acrylates. For some applications such a combination might be even advantageous as it might boost other properties. For example novolac epoxy acrylates are known for their hardness and resistances. Addition of small amounts might improve the performance.

Methacrylate Reactive Diluent(s) (B)

The inventive radical-curable coating composition comprises at least one methacrylate reactive diluent with a methacrylate functionality higher than 2. Mixtures of methacrylate functional reactive diluents with a functionality higher than 2 can be employed as well. Suitable methacrylate functional reactive diluents are for example trimethylolpropane trimethacrylate, glycerol trimethacrylate, pentaerythritol tetramethacrylate ditrimethylol propane tetramethacrylate, dipentaerythritol hexamethacrylate, and their ethoxylated and/or propoxylated versions. In case more than one methacrylate reactive diluent is present in the radical-curable coating composition of the present invention, the methacrylate reactive diluents have an average methacrylate functionality higher than 2. The molar mass of the methacrylate functional reactive diluents is preferably higher than 200 g/mol, more preferably higher than 290 g/mol and even more preferably higher than 300 g/mol.

Acrylate Reactive Diluent(s) (C)

The inventive radical-curable coating composition comprises at least one acrylate reactive diluent with an acrylate functionality higher than 2. Mixtures of acrylate functional reactive diluents with a functionality higher than 2 can be employed as well. Suitable acrylate functional reactive diluents are for example trimethylol propane tri-acrylate, glycerol tri-acrylate, pentaerythritol tetra-acrylate ditrimethylol propane tetra-acrylate, dipentaerythritol hexa-acrylate, and their ethoxylated and/or propoxylated versions. In case more than one acrylate reactive diluent is present in the radical-curable coating composition of the present invention, the acrylate reactive diluents have an average acrylate functionality higher than 2. The molar mass of the acrylate functional reactive diluent is preferably higher than 170 g/mol, more preferably higher than 240 g/mol and even more preferably higher than 250 g/mol.

Next to the (meth)acrylate reactive diluents with a (meth) acrylate functionality higher than 2 ((B) and (C)), di- or even mono-functional (meth)acrylate reactive diluents might be present as well.

In case a mixture of one or more methacrylate reactive diluents with a functionality higher than 2 and one or more methacrylate reactive diluents with a functionality lower than or equal to 2 is used, the average methacrylate functionality of the methacrylate functional reactive diluents composition must be higher than 2 and is preferably higher than 2.4, more preferably higher than 2.5 and even more preferably higher than 2.6.

In case a mixture of one or more acrylate reactive diluents with a functionality higher than 2 and one or more acrylate reactive diluents with a functionality lower than or equal to 2 is used, the average acrylate functionality of the acrylate reactive diluents composition must be higher 2 and is preferably higher than 2.05, more preferably higher than 2.1 and even more preferably higher than 2.2.

As used herein, the average methacrylate functionality of the methacrylate reactive diluents with a molar mass as defined for $$(B) = \bar{f} = \frac{\sum_k \frac{w_k}{M_k} f_k}{\sum_k \frac{w_k}{M_k}},$$

in which $w_k$ is the amount of methacrylate reactive diluents in g present in the radical curable coating composition with a specific molar mass $M_k$ as defined for (B) (i.e. lower than 800 g/mol) and with a specific methacrylate functionality $f_k$ which can be 1, 2 or higher than 2.

As used herein, the average acrylate functionality of the acrylate reactive diluents with a molar mass as defined for $$(C) = \bar{f} = \frac{\sum_k \frac{w_k}{M_k} f_k}{\sum_k \frac{w_k}{M_k}},$$

in which $w_k$ is the amount of acrylate reactive diluents in g present in the radical-curable coating composition with a specific molar mass $M_k$ as defined for (C) (i.e. lower than 800 g/mol) and with a specific acrylate functionality $f_k$ which can be 1, 2 or higher than 2.

The acrylate reactive diluents (C) and the methacrylate reactive diluents (B) are preferably present in the inventive radical-curable coating compositions in a weight ratio of the acrylate reactive diluents (C) to the methacrylate reactive diluents (B) of from 0.1 to 5. The weight ratio of the acrylate reactive diluents (C) to the methacrylate reactive diluents (B) is more preferably at least 0.2, even more preferably at least 0.3, even more preferably at least 0.4. The weight ratio of the acrylate reactive diluents (C) to the methacrylate reactive diluents (B) is more preferably at most 4.5, even more preferably at most 4, even more preferably at most 3.5.

The acrylate functionalities of the acrylate reactive diluents (C) and the methacrylate functionalities of the methacrylate reactive diluents (B) are present in the radical-curable coating composition of the present invention in a molar ratio of the acrylate functionalities to the methacrylate functionalities of at least 0.2, i.e. the ratio of the molar amount of acrylate functionalities present in the acrylate reactive diluents (C) to the molar amount of methacrylate functionalities present in the methacrylate reactive diluents (B) is at least 0.2. The ratio of the molar amount of acrylate functionalities present in the acrylate reactive diluents (C) to the molar amount of methacrylate functionalities present in the methacrylate reactive diluents (B) is preferably at most 8. Preferably, the molar ratio of the acrylate functionalities of the acrylate reactive diluents (C) to the methacrylate functionalities of the methacrylate reactive diluents (B) is at least 0.3, more preferably at least 0.5, even more preferably at least 1.5 and preferably at most 8, more preferably at most 7, more preferably at most 6 and even more preferably at most 5. Most preferably, the molar ratio of the acrylate functionalities of the acrylate reactive diluents (C) to the methacrylate functionalities of the methacrylate reactive diluents (B) is in the range from 0.5 to 5.

Said one or more reactive diluents (B) and (C) are present in the inventive radical-curable coating composition in an amount higher than 10 wt. % and lower than 80 wt. %, based on the total amount of (A), (B) and (C). Said one or more reactive diluents (B) and (C) are present in the inventive radical-curable coating composition in an amount of preferably at least 15 wt. %, more preferably at least 20 wt. %, more preferably at least 25 wt. %, and preferably in an amount of at most 75 wt. %, more preferably at most 70 wt. %, more preferably at most 60 wt. %, based on the total amount of (A), (B) and (C).

The total amount of (A), (B) and (C) in the inventive radical-curable coating composition is at least 25 wt. % of the radical-curable coating composition, preferably at least 40 wt. %, more preferably at least 60 wt. % by weight of the radical-curable coating composition.

The radical-curable coating composition used in the process of the present invention is preferably 100% radical-curable. A 100% radical-curable coating composition refers to a coating composition which is substantially free of water and non-polymerizable volatile compounds. As used herein, substantially free of water and non-polymerizable volatile compounds means that the composition contains less than 20 wt. %, preferably less than 10 wt. % more preferably less than 5 wt. %, more preferably less than 3 wt. %, more preferably less than 1 wt. % of water and non-polymerizable volatile compounds by weight of the radical-curable coating composition of the present invention. A non-polymerizable volatile compound is a compound having an initial boiling point less than or equal to 250° C. measured at a standard atmospheric pressure of 101.3 kPa.

The composition according to the invention comprises one or more photo-initiators (D). A photo-initiator is a compound that chemically changes due to the action of light or the synergy between the action of light and the electronic excitation of a sensitizing dye to produce at least one of a radical, an acid, and a base. Well-known types of photo-initiators include cationic photo-initiators and free radical photo-initiators. Preferably, the one or more photo-initiators (D) are free radical photo-initiators.

The free radical photo-initiator can be any kind of free radical photo-initiatior. It can be an α-cleavage initiator as for example α-hydroxy ketones or a type II system for example a sensitizer/H-donor combination, like benzophenone/amine.

In an embodiment, the photo-initiator compound includes, consists of, or consists essentially of one or more acylphosphine oxide photo-initiators. Acylphosphine oxide photo-initiators are known, and are disclosed in, for example, U.S. Pat. Nos. 4,324,744, 4,737,593, 5,942,290, 5,534,559, 6,020,529, 6,486,228, and 6,486,226. Preferred types of acylphosphine oxide photo-initiators for use in the photo-initiator compound include bisacylphosphine oxides (BAPO) or monoacylphosphine oxides (MAPO). More specifically, examples include 2,4,6-trimethyl-benzoylethoxy-phenylphosphine oxide (CAS #84434-11-7) or 2,4,6-trimethylbenzoyl-diphenylphosphine oxide (CAS #127090-72-6).

In a preferred embodiment, the photo-initiator compound includes, consists of, or consists essentially of one or more α-hydroxy ketone photo-initiators. For instance, suitable α-hydroxy ketone photo-initiators are α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone, 2-Hydroxy-1-{4-[4-(2-hydroxy-2-methyl-propionyl)-benzyl]-phenyl}-2-methyl-propan-1-one and 2-hydroxy-2-methyl-1-[(2-hydroxyethoxy)-phenyl]propanone.

In another embodiment, the photo-initiator compound includes, consists of, or consists essentially of: one or more α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl) phenyl]-1-butanone or 2-benzyl-2-(dimethylamino)-1-[3,4-dimethoxyphenyl]-1-butanone; one or more ketal compounds, for example 2,2-dimethoxy-1,2-diphenyl-ethanone; and one or more monomeric or dimeric phenylglyoxylic acid esters, such as methylphenylglyoxylic acid ester, 5,5'-oxo-di(ethyleneoxydicarbonylphenyl) or 1,2-(benzoyl-carboxy)ethane.

Yet further suitable photo-initiators (D) include oxime esters, such as those disclosed in U.S. Pat. No. 6,596,445. Still another class of suitable photo-initiators (D) include, for example, phenyl glyoxalates, for example those disclosed in U.S. Pat. No. 6,048,660.

In another embodiment, the photo-initiator compound may comprise, consist of, or consist essentially of one or more alkyl-, aryl-, or acyl-substituted compounds not mentioned above herein.

According to another embodiment, the composition may contain a photo-initiator that is an alkyl-, aryl-, or acyl-substituted compound. In an embodiment the alkyl-, aryl-, or acyl-substituted photo-initiator possesses or is centered around an atom in the Carbon (Group 14) group. In such instance, upon excitation (via absorption of radiation) the Group 14 atom present in the photo-initiator compound forms a radical. Such compound may therefore produce a radical possessing or centered upon an atom selected from the group consisting of silicon, germanium, tin, and lead. In an embodiment, the alkyl-, aryl-, or acyl-substituted photo-initiator is an acylgermanium compound. Such photo-initiators are described in, U.S. Pat. No. 9,708,442. Known specific acylgermanium photo-initiators include benzoyl trimethyl germane (BTG), tetracylgermanium, or bis acyl germanoyl (commercially available as Ivocerin® from Ivoclar Vivadent AG, 9494 Schaan/Liechtenstein).

Photo-initiators according to the present invention may be employed singularly or in combination of one or more as a blend. Suitable photoinitiator blends are for example disclosed in U.S. Pat. No. 6,020,528 and U.S. Pat. app. No. 60/498,848. According to an embodiment, the photo-initiator compound includes a photo-initiator blend of, for example, bis(2,4,6-trimethylbenzoyl) phenyl phosphine oxide (CAS #162881-26-7) and 2,4,6,-trimethylbenzoylethoxyphenylphosphine oxide (CAS #84434-11-7) in ratios by weight of about 1:11, 1:10, 1:9, 1:8 or 1:7.

Another especially suitable photo-initiator blend is a mixture of bis(2,4,6-trimethylbenzoyl)phenyl phosphine oxide, 2,4,6,-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable photoinitiator blend is a mixture of bis(2,4,6-trimethylbenzoyl)phenyl phosphine oxide and 2-hydroxy-2-methyl-1-phenyl-1-propanone in weight ratios of for instance about 1:3, 1:4 or 1:5.

Sensitizers for a sensitizer/H-donor system are compound like for example benzophenones, such as benzophenone, 2,4,6-trimethylbenzophenone, 4-methylbenzo-phenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)-benzophenone, 2,4,6-trimethyl-4'-phenyl-benzophenone or 3-methyl-4'-phenyl-benzophenone; Thioxantones such as for example thioxanthone and substituted thioxanthones like isopropylthioxantone and chlorothioxanthone.

In a sensitizer/H-donor system, the H-donors are preferably amines. Most preferably tertiary amines. The amines can be aromatic or aliphatic. A suitable example of an aromatic amine is ethyl 4-N,N-dimethylamino benzoate. Suitable examples of small aliphatic tertiary amines are compounds like N,N-dimethyl ethanol amine, N-methyl diethanol amine and triethanol amine. Also the Michael-addition products of amines with (meth)acrylates can be very suitable. For example the addition product of amonia with 3 equivalent of a diacrylate like diethylene glycol diacrylate, i.e. an acrylate functional tertiary aliphatic amine is can be very suitable. Other amines like for example ethanol amine, ethylene diamine, N-methyl ethanol amine can be used in the Michael addition as well, all being able to yield acrylate functional amines as H-donor, also called amine synergist.

One or more of the aforementioned photo-initiators can be employed for use in the photoinitiator compound in compositions according to the present invention in any suitable amount and may be chosen singly or in combination of one or more of the types enumerated herein. In a preferred embodiment, the photo-initiator compound comprises, consists of, or consists essentially of free radical photo-initiators. In an embodiment, the photo-initiator compound is present in an amount, relative to the entire weight of the composition, of from about 0.1 wt. % to about 10 wt. %, or from about 0.1 wt. % to about 5 wt. %, or from about 1 wt. % to about 5 wt. %.

Preferably, the one or more photo-initiators present in the composition according to the invention are α-cleavage photo-initiators. Even more preferably the one or more photo-initiators present in the composition according to the invention are an α-hydroxy ketone and/or an acyl phosphine oxide.

The composition according to the invention comprises one or more thermal initiators (E). A thermal initiator is a compound that chemically changes due to the action of increasing temperature to produce at least one of a radical, an acid, and a base. In the present invention, the one or more thermal initiators (E) are free radical thermal initiators. Suitable examples of free radical thermal initiators are for instance azo-compounds and peroxides. The free radical thermal initiator can be a single initiator or mixtures of initiators. The activity of thermal initiators can be characterized in many ways. As a minimum stability is required, i.e. the thermal initiator should not initiate the polymerization before the UV-initiation has taken place, a suitable way to select preferred thermal initiators is via the 0.1 hr half-life temperature, i.e. the temperature at which 50% of the thermal initiator has generated radicals in 0.1 hr.

The one or more thermal initiators (E) are preferably selected from the group consisting of free radical thermal initiators having a 0.1 hour half-life temperature equal to or greater than 70° C., more preferably equal to or greater than 75° C., more preferably equal to or greater than 80° C., and even more preferably equal to or greater than 85° C. and preferably lower than 280° C., more preferably lower than 250° C., even more preferably lower than 220° C. and even more preferably lower than 200° C. For ensuring a good reactivity during the thermal curing step, the free radical thermal initiator preferably has a 0.1 hr half-life temperature equal to or lower than 280° C., more preferably equal to or lower than 250° C., more preferably equal to or lower than 220° C., and most preferably equal to or lower than 200° C.

The thermal curing step can take place immediately after having carried out the UV-cure but also much later. During this storage of the UV-cured coating composition comprising the thermal initiator, it is preferred that the temperature at which the UV-cured formulation is stored is such that it is below the preferred maximum storage temperature of the thermal initiator. Therefore the thermal initiator preferably has a maximum storage temperature equal to or greater than 5° C., preferably equal to or greater than 10° C. more preferably equal to or greater than 15° C., even more preferred equal to or greater than 20° C. or equal to or greater than 25° C.

Without wishing to be bound by theory, it is hypothesized that in the UV cured coating composition, especially when the UV cure has resulted in a tack free formulation, that the solid nature of the UV cured formulation increases the ability to safely store the substrates containing the partially cured coating. As example, as demonstrated in the experimental part, a formulation comprising tert-amyl peroxy-2-ethylhexanoate (Trigonox 121) having a maximum storage temperature of 5° C., could after UV cure be stored for at least 24 hr at room temperature before applying the thermal process step.

A person skilled in the art can, using for example the brochure "Initiators for thermoplastics" by Nouryon February 2021, determine which peroxides and/or azo compounds are best suited for the thermal process at hand, especially since both time and temperature, during the thermal process step might vary.

Suitable thermal initiators are for example carbonates like mono- and di-percarbonates, peresters, peranhydrides, perketals, hydroperoxides and azo compounds.

Examples of suitable di-percarbonates are for instance: di(4-tert-butylcyclohexyl) peroxydicarbonate, Perkadox 16

(Maximum storage temperature 20° C., 0.1 hr half life temperature 82° C.); diacetyl peroxydicarbonate, Perkadox 24 (Maximum storage temperature 20° C., 0.1 hr half life temperature 84° C.); dimyristyl peroxydicarbonate, Perkadox 26 (Maximum storage temperature 15° C., 0.1 hr half life temperature 84° C.).

Examples of suitable monopercarbonates are for instance: tert-butylperoxy isopropyl carbonate, Trigonox BPIC-C75 (Maximum storage temperature 25° C., 0.1 hr half life temperature 137° C.); tert-butylperoxy 2-ethylhexyl carbonate, Trigonox 117 (Maximum storage temperature 20° C., 0.1 hr half life temperature 137° C.).

Examples of suitable peranhydrides are for instance: dilauroyl peroxide, Laurox (Maximum storage temperature 30° C., 0.1 hr half life temperature 99° C.); didecanoyl peroxide, Perkadox SE-10 (Maximum storage temperature 10° C., 0.1 hr half life temperature 100° C.); dibenzoyl peroxide, Perkadox L-W75 (Maximum storage temperature 40° C., 0.1 hr half life temperature 113° C.).

Examples of suitable peresters are for instance: 1,1,3,3-tetramethylbutyl peroxy-2-ethylhexanoate, Trigonox 421 (Maximum storage temperature 5° C., 0.1 hr half life temperature 109° C.); tert-amyl peroxy-2-ethylhexanoate, Trigoxox 121 (Maximum storage temperature 5° C., 0.1 hr half life temperature 111° C.); tert-butyl peroxy-2-ethylhexanoate, Trigonox 21S (Maximum storage temperature 10° C., 0.1 hr half life temperature 113° C.); tert-butyl peroxy-3,5,5-trimethylhexanoate, Trigonox 42S (Maximum storage temperature 25° C., 0.1 hr half life temperature 135° C.); tert-amyl peroxybenzoate, Trigonox 127 (Maximum storage temperature 20° C., 0.1 hr half life temperature 139° C.); tert-butyl peroxybenzoate, Trigonox C (Maximum storage temperature 25° C., 0.1 hr half life temperature 142° C.).

Examples of suitable perketals are for instance: 1,1-di(tert-butylperoxy)-3,3,5-trimethylcyclohexane, Trigonox 29 (Maximum storage temperature 25° C., 0.1 hr half life temperature 128° C.); 1,1-di(tert-butylperoxy)cyclohexane Trigonox 22B50 (Maximum storage temperature 25° C., 0.1 hr half life temperature 134° C.); 2,2-di(tert-butylperoxy) butane, Trigonox D-C50 (Maximum storage temperature 30° C., 0.1 hr half life temperature 136° C.); butyl 4,4-di (tert-butylperoxy)valerate, Trigonox 17 (Maximum storage temperature 30° C., 0.1 hr half life temperature 143° C.); dicumyl peroxide, Perkadox BC-FF (Maximum storage temperature 30° C., 0.1 hr half life temperature 154° C.); tert-butyl cumyl peroxide, Trigonox T (Maximum storage temperature 40° C., 0.1 hr half life temperature 159° C.).

Examples of suitable azo compounds are for instance: 2,2'-azodi(isobutyronitrile), Perkadox AIBN (Maximum storage temperature 25° C., 0.1 hr half life temperature 101° C.); 2,2'-azodi(2-methylbutyronitrile), Perkadox AMBN-GR (Maximum storage temperature 25° C., 0.1 hr half life temperature 104° C.); 1,1'-azodi(hexahydrobenzonitrile), Perkadox ACCN (Maximum storage temperature 35° C., 0.1 hr half life temperature 123° C.).

The one or more thermal initiators (E) preferably comprises an initiator selected from the group of monopercarbonates, peresters and/or peranhydrides. More preferably, the one or more thermal initiators (E) present in the inventive coating composition are selected from the group consisting peresters, monopercarbonates, peranhydrides or any mixture thereof.

Next to the thermal initiator also an accelerator or accelerator mixture for facilitating decomposition of the thermal initiator might be present. As accelerator various compounds can be used. Especially transition metals, for example selected from the group of V, Cr, Mn, Fe, Co, Ni, Cu salts and complexes and any mixture thereof can be selected as accelerator.

The thermal initiator may be present in a thermal initiator composition. In a preferred embodiment, the thermal initiator composition consists of, or consists essentially of free radical thermal initiators. In an embodiment, the thermal initiator is present in an amount, relative to the entire weight of the coating composition, of from about 0.1 wt. % to about 10 wt. %, or from about 0.1 wt. % to about 5 wt. %, or from about 1 wt. % to about 5 wt. %.

The inventive coating composition preferably further comprises one or more thermal cure retarders. Examples of suitable thermal cure retarders are for example compounds like phenotiazines like for example phenothiazine and substituted derivatives; phenols like for example p-methoxy phenol (Mequinol), 2,6-di-t-butyl phenol, 2,6-di-t-butyl-4-methyl phenol (BHT), tocopherol; Hydroquinone like for example hydroquinone, 2-methyl hydroquinone (MeHQ), 2-t-butyl hydroquinone, 2,3-dimethyl hydroquinone, 2,5-dimethyl hydroquinone, 2,6-dimethyl hydroquinone, trimethyl hydroquinone; catechols like for example catechol, 4-t-butyl catechol, benzoquinones like for example benzo-quinone, 2-methyl benzoquinone; orthoquinones like for example orthoquinone, 3-methyl orthoquinone, pyrogallols like for example pyrogallol, gallic acid, propyl gallate; stable radicals like for example N-oxyl radicals, for example compounds like Tempo, Tempol, Proxyl, Doxyl and derivatives. Instead of a single thermal cure retarder, mixtures of thermal cure retarders can be used as well.

Preferably at least one of the thermal cure retarders present in the coating composition according to the invention is selected from the group of (substituted) phenols, hydroquinones, pheonols, catchols, benzoquinones and orthoquinones, more preferably selected from the group of (substituted) hydroquinones, catchols and benzoquinones and even more preferably the one or more inhibitors are selected from the group consisting of alkyl substituted hydroquinones, alkyl substituted phenols, alkoxy substituted phenols, alkyl substituted catechols, alkyl substituted benzoquinones, alkyl substituted orthoquinones and mixtures thereof.

The present invention further relates to a method for obtaining a coated substrate, wherein the method comprises (1) providing a substrate having a major surface, (2) applying the radical-curable coating composition as defined herein above on at least a portion of the major surface of the substrate in a layer thickness preferably in the range of from 0.1 micron to 1 mm, and (3) photo-curing of the coating composition to obtain a substrate with a partially cured coating, and (4) thermally curing the partially cured coating to obtain the coated substrate.

Suitable substrates for the process according to the invention are for example mineral substrates such as fiber cement board, wood, wood containing materials, paper including cardboard, textile, leather, metal, thermoplastic polymer, thermosets, ceramic, glass. Suitable thermoplastic polymers are for example polyvinylchloride PVC, polymethylmethacrylate PMMA, acrylonitrile-butadiene-styrene ABS, polycarbonate, polypropylene PP, polyethylene PE, polyamide PA and polystyrene. Suitable thermosets are for example linoleum, epoxy, melamine, novolac, polyesters and urea-formaldehyde.

Preferred substrates are flat (i.e. not containing sharp edges or angles <150° in the surface to be coated) and non-porous substrate (i.e. not so porous that the coating composition when it is applied would essentially only penetrate into the substrate). The substrate is optionally pre-treated and/or optionally pre-coated. For example, thermoplastic plastic films can be treated with corona discharges before application or pre-coated with a primer. Mineral building materials are also usually provided with a primer before the coating composition is applied.

The photo-curing step (3) is preferably carried out applying an UV dose ranging from 0.02 $J/cm^2$ to 10 $J/cm^2$. The UV dose is preferably at least 0.05 $J/cm^2$, more preferably at least 0.1 $J/cm^2$, even more preferably at least 0.2 $J/cm^2$, even more preferably at least 0.6 $J/cm^2$. The UV dose is preferably lower than 9 $J/cm^2$, more preferably lower than 8 $J/cm^2$. According to an embodiment of the invention, the UV dose is in the range of from 1 $J/cm^2$ to 5 $J/cm^2$.

The photo-curing can be performed in air or under inert conditions like under a nitrogen blanket. Performing the photo-curing under a nitrogen blanket is preferred when the photo-cured coated substrate is stored for a period of time prior to carrying out the thermal process step (4).

The thermal cure step (4) is preferably carried out at a temperature in the range from 100° C. to 300° C. The temperature during the thermal cure step is preferably higher than 125° C., more preferably higher than 150° C. and preferably lower than 275° C., more preferably lower than 250° C.

Preferably the thermal cure step (4) is carried out while hot pressing the partially cured coating, more preferably the hot pressing is carried out on a stack that comprises the substrate with the partially cured coating obtained in step (3). The hot pressing may carried out with the help of a structured pressing element wherein a relief is formed in the coating. The thermal cure step (4) can suitable be carried out in a laminating step in which the coated substrate is laminated onto another material. An example of such a process is laminating a coated paper onto a thin wooden substrate or a vinyl tile. The thermal cure step (4) can also be suitable performed in an embossing step. This is especially useful for the production of materials with a structured surface. Lamination and embossing can also be performed in the thermal cure step (4).

The inventive coating composition can in particular advantageously be used on a floor or on furniture, on window frames or on façade panels.

The coated substrate obtained with the method of the invention is preferably a coated panel, more preferably a furniture panel or a floor panel.

The invention further relates to objects comprising or coated with a coated substrate obtained with the method of the invention.

The present invention is now illustrated by reference to the following examples. Unless otherwise specified, all parts, percentages and ratios are on a weight basis.

Table 1 describes the various components used for preparing the compositions used in the present examples.

TABLE 1

| Resins | Supplier | Type | Molar mass (g/mol) | Functionality (theor.) | Amount and type of inhibitor |
|---|---|---|---|---|---|
| NeoRad ™ U-25 (neat) | DSM Coating Resins B.V. | Urethane acrylate | 1300 | 2 | 100-1000 ppm 2,6-di-t-butyl-4-methyl phenol (BHT) |
| AgiSyn ™ 230A2 | DSM Coating Resins B.V. | Urethane acrylate | 1000 | 6 | 100-1000 ppm BHT |
| NeoRad ™ U-65 (neat) | DSM Coating Resins B.V. | Urethane acrylate | 1700 | 6 | 100-1000 ppm BHT |
| AgiSyn ™ 670T 1 | DSM Coating Resins B.V. | Urethane acrylate | 1600 | 2 | <3000 ppm BHT |
| AgiSyn ™ 730 | DSM Coating Resins B.V. | Polyester acrylate | 1500 | 4 | <1000 ppm 2-methyl hydroquinone (MeHQ) |
| AgiSyn ™ 705 | DSM Coating Resins B.V. | Polyester acrylate | 1300 | 4 | <3000 ppm Mequinol |
| AgiSyn ™ 9760 (supplied in 50% TMPTA) | DSM Coating Resins B.V. | Novolac glycidyl epoxy acrylate | 1500 | 3 | 100-1000 ppm MeHQ |
| AgiSyn ™ 2020 | DSM Coating Resins B.V. | Epoxidized soy bean oil acrylate | 1100 | 2 | 100-1000 ppm MeHQ |
| Resinous reactive diluents | | | | | |
| NeoRad ™ P-11 | DSM Coating Resins B.V. | Polyester acrylate | 750 | 3 | <3000 ppm p-methoxy phenol (Mequinol) |
| AgiSyn ™ 1010 | DSM Coating Resins B.V. | Bisphenol A glycidyl epoxy acrylate | 500 | 2 | 100-1000 ppm MeHQ |
| Reactive diluents | | | | | |
| BMA (butyl methacrylate) | Aldrich | Methacrylate diluent | 142 | 1 | 1000 ppm methoxyphenol |
| TEGDMA (triethyleneglycol dimethacrylate) | Aldrich | Methacrylate diluent | 286 | 2 | 100 ppm MeHQ |
| TMP(EO)₉TMA (Ethoxylated (9) Trimethylolpropane trimethacrylate, Komerate T093M) | KPX Green Chemical Co., Ltd. | Methacrylate diluent | 724 | 3 | 100-300 ppm MeHQ |
| PPTTMA (penta ethoxylated pentaerythritol tetra methacrylate, Komerate M044M) | KPX Green Chemical Co., Ltd. | Methacrylate diluent | 610 | 4 | 100-300 ppm MeHQ |
| LA (Lauryl acrylate, AgiSyn ™ 2896) | DSM Coating Resins B.V. | Acrylate diluent | 240 | 1 | 60-100 ppm Methoxy phenol |
| DPGDA (Dipropylene glycol diacrylate, AgiSyn ™ 2833) | DSM Coating Resins B.V. | Acrylate diluent | 242 | 2 | 400-800 ppm MeHQ |
| TMPTA (Trimethylolpropane triacrylate, AgiSyn ™ 2811) | DSM Coating Resins B.V. | Acrylate diluent | 296 | 3 | 100-300 ppm MeHQ |
| GPTA (glycerol propoxylate triacrylate, AgiSyn ™ 2837) | DSM Coating Resins B.V. | Acrylate diluent | 428 | 3 | 200-500 ppm MeHQ |

TABLE 1-continued

| Resins | Supplier | Type | Molar mass (g/mol) | Functionality (theor.) | Amount and type of inhibitor |
|---|---|---|---|---|---|
| PPTTA (pentaethoxylated pentaerythritol tetraacrylate, AgiSyn ™ 2844) | DSM Coating Resins B.V. | Acrylate diluent | 55 | 4 | 200-600 ppm MeHQ |
| Photoinitiators | | | | | |
| Omnirad 1173 | IGM Resins | α-hydroxy ketone | | | |
| Omnirad TPO-L | IGM Resins | Monoacyl phosphine oxide | | | |
| Omnirad BP | IGM Resins | Benzophenone | | | |
| AgiSyn ™ 002 | DSM Coating Resins B.V. | Amine synergist | | | |
| Thermal initiators | | | | | |
| MBPO (4-methyl benzoyl peroxide, powder with 25% water, Perkadox PM-W75) | Nouryon | Peranhydride | | | |
| LPO (Lauroyl peroxide, Laurox S) | Nouryon | Peranhydride | | | |
| TBPEH (t-butyl peroxy 2-ethylhexanoate, Trigonox 21S) | Nouryon | Perester | | | |
| TAPEH (t-amyl peroxy 2-ethylhexanoate, Trigonox 121) | Nouryon | Perester | | | |
| TBH (t-butyl hydroperoxide, Trigonox A-80) | Nouryon | Hydroperoxide | | | |

Preparation of Urethane (Meth)Acrylate Oligomers 1 to 3

Urethane (meth)acrylate oligomers 1 to 3 used herein were prepared using the molar amounts specified below. After charging the diisocyanate, the catalyst (100 ppm, Dibutyltin dilaurate DBTDL, obtained from Evonik), and the stabilizer (250 ppm BHT, Aldrich) into the reactor, the hydroxy-functional compounds were added sequentially after completion of the previous urethane reaction.

Urethane acrylate resin 1 (Resin 1): 2 mols isophorone diisocyanate IPDI (obtained from Covestro AG), 1 mol $PPG_{2000}$ (bifunctional polypropylene glycol with a theoretical molar mass of 2000, obtained from Covestro AG) and 2 mols 2-hydroxyethyl acrylate HEA (obtained from Aldrich) resulting in HEA-IPDI-$PPG_{2000}$-IPDI-HEA as idealized structure and with a calculated theoretical molar mass of 2676 g/mol and an acrylate functionality of 2.

Urethane methacrylate resin 2 (Resin 2): 2 mols IPDI, 1 mol $PPG_{2000}$ and 2 mols 2-hydroxymethyl acrylate HEMA (obtained from Aldrich) resulting in HEMA-IPDI-PPG 2000-IPDI-HEMA as idealized structure and with a calculated theoretical molar mass of 2704 g/mol and a methacrylate functionality of 2.

Urethane acrylate resin 3 (Resin 3): 3 mols toluene diisocyanate TDI (obtained from Covestro AG), 2 mols $PPG_{2000}$ and 2 mols ethoxylated (5) trimethylolpropane diacrylateTMP(EO)$_5$DA (with a theoretical molar mass of 462 obtained from DSM Resins) resulting in TMP(EO)$_5$DA-TDI-$PPG_{2000}$-TDI-$PPG_{2000}$-TDI-TMP(EO)$_5$DA as idealized structure and with a calculated theoretical molar mass of 5446 g/mol and an acrylate functionality of 4.

Preparation of the Formulations

The ingredients listed in Table 2 to 11 were added into a HDPP jar and mixed thoroughly using a speedmixer (DAC 150.1 FV, Hauschield GmbH) for 2 min @ 3500 rpm.

Application and Curing of the Formulations

The formulations were applied as a 100 micron wet layer on a melamine impregnated paper (ex Schattdecor GmbH).

UV Cure: Within 20 seconds after application, the formulations were UV cured under nitrogen (<100 ppm $O_2$) on a UVio curing rig with a conveyor belt speed of 60 m/min (unless otherwise stated) using a 240W Hg lamp at 50% power (LightHammer Mark III ex Heraeus Holding, Hg doped UV lamp generating UV light with wave lengths ≥300 nm, 86 mJ/cm² total dose as determined with am Power Puck II (EIT Inc)).

Thermal Cure: The coated and UV cured papers were thermally laminated on high-density fibreboard HDF board and cured using a lamination press (LAP20, ex Joos GmbH) during 60 seconds, at 210° C. (upper surface only) with a force of 45 kg/cm².

Evaluations of the Coatings 24 hrs after UV cure, the coating was evaluated regarding visual appearance, surface quality and tack. 24 hrs after the subsequent thermal cure, the final appearance was visually evaluated. 0 being very bad and 5 very good. Only rating of 4 and 5 are considered acceptable.

Calculation of Average Functionality of (Meth)Acrylate Reactive Diluents

The average (meth)acrylate functionality of the (meth) acrylate reactive diluents with a molar mass as defined for (B) and (C) (less than 800 g/mol) (further referred to as calculated average functionality of (meth)acrylate diluents) is calculated according to $$\bar{f} = \frac{\sum_k \frac{w_k}{M_k} f_k}{\sum_k \frac{w_k}{M_k}},$$

in which $w_k$ is the amount of (meth)acrylate reactive diluents in g present in the radiation curable coating composition with a specific molar mass $M_k$ as defined for (B) (or (C)) and with a specific (meth)acrylate functionality $f_k$ which can be 2 or lower or higher 2. We illustrate this calculation with a theoretical example for an acrylate reactive diluent mixture: For a formulation consisting of 60 grams of urethane acrylate oligomer having molar mass >800 g/mol, 30 grams of DPGDA (having molar mass 242 g/mol and acrylate functionality of 2), 10 grams of ditrimethylolpropane tetraacrylate Di-TMPTA (having molar mass 466 g/mol and acrylate functionality of 4), and 2.5 grams of photoinitiator: the summation over components k includes only DPGDA and Di-TMPTA and the calculated average functionality of acrylate diluents of this theoretical formulation is $$\bar{f} = \frac{\frac{30 \text{ g}}{242 \frac{\text{g}}{\text{mol}}} \times 2 + \frac{10 \text{ g}}{466 \frac{\text{g}}{\text{mol}}} \times 4}{\frac{30 \text{ g}}{242 \frac{\text{g}}{\text{mol}}} + \frac{10 \text{ g}}{466 \frac{\text{g}}{\text{mol}}}} = 2.3.$$

Calculation of Molar Acrylate/Methacrylate Ratio in the Reactive Diluent(s) (Molar A/M Ratio in RD)

The molar amount of acrylate functionalities in the acrylate reactive diluents is divided by the molar amount of methacrylate functionalities in the methacrylate reactive diluents.

We illustrate this calculation with the following theoretical example:

For a formulation consisting of 70 grams of AgiSyn™ 670T1 (urethane acrylate oligomer having molar mass >800 g/mol), 12.5 grams of GPTA (having a molar mass of 428 g/mol and an acrylate functionality of 3), 2.5 grams of DPGDA (having a molar mass of 242 g/mol and acrylate functionality of 2), 12.5 grams of TMP(EO)9TMA (having a molar mass of 724 g/mol and a methacrylate functionality of 3), 2.5 grams of TEGDMA (having a molar mass of 286 g/mol and a methacrylate functionality of 2), 0.15 grams Omnirad 1173 and 0.5 grams MBPO: The acrylate reactive diluents are GPTA and DPGDA, the methacrylate reactive diluents are TMP (EO)9TMA and TEGDMA. The calculation of the molar acylate/methacrylate ratio is as follows $$\frac{\left(\frac{3 * 12.5 \text{ g}}{428 \text{ g/mol}} + \frac{2 * 2.5 \text{ g}}{242 \text{ g/mol}}\right)}{\left(\frac{3 * 12.5 \text{ g}}{724 \text{ g/mol}} + \frac{2 * 2.5}{286 \text{ g/mol}}\right)} = 1.56.$$

Tables 2 to 11 give the relative amounts of the components used to prepare the formulations of the Examples and the Comparative Experiments and report the evaluation of the coatings obtained with these formulations.

Example 1 and Comparative Experiments C1-C6; Variation in Reactive Diluent

TABLE 2

| | Ex 1 | C1 | C2 | C3 | C4 | C5 | C6 |
|---|---|---|---|---|---|---|---|
| NeoRad ™ U-25 (neat) | 70 | 70 | 70 | 70 | 70 | 70 | 70 |
| TEGDMA | | 30 | | | | | |
| TMP(EO)₉TMA | 15 | | 30 | | | | |
| PPTTMA | | | | 30 | | | |
| DPGDA | | | | | 30 | | |
| GPTA | 15 | | | | | 30 | |
| PPTTA | | | | | | | 30 |
| Molar A/M ratio in RD | 1.7 | NA | NA | NA | 0 | 0 | 0 |
| Omnirad 1173 | 0.15 | 0.15 | 0.15 | 0.15 | 0.15 | 0.15 | 0.15 |
| MBPO | 0.50 | 0.50 | 0.50 | 0.50 | 0.50 | 0.50 | 0.50 |
| After UV | Wrinkles | Wet | Fine wrinkles | Wrinkles | Smooth | Smooth | Smooth |
| Surface | Tack free | Wet | Tack free | Tack free | Tack free | Tack free | Tack free |
| Score | 4 | 0 | 4 | 4 | 5 | 5 | 5 |
| Final Appearance | Good | Coating sunk in paper | Flaking | Flaking | Cracking, blistering, flaking and delamination | Cracking, blistering, flaking and delamination | Cracking, blistering, flaking and delamination |
| Final score | 5 | 0 | 2 | 2 | 1 | 1 | 1 |

These results clearly indicate that good final results can only be obtained in the presence of both a methacrylate functional reactive diluent and an acrylate functional reactive diluent. In C4-C6 it is further shown that a smooth tack free surface after UV cure does not guarantee a good final coating

TABLE 3

| Resin | Molar mass | F | E2 | E3 | E4 | E5 | E6 | E7 | C7 | C8 | C9 | C10 | C11 |
|---|---|---|---|---|---|---|---|---|---|---|---|---|---|
| NeoRad™ U-25 | 1300 | 2 | 70 | | | | | | | | | | |
| AgiSyn™ 230A2 | 1000 | 6 | | 70 | | | | | | | | | |
| NeoRad™ U-65 | 1700 | 6 | | | 70 | | | | | | | | |
| Resin 1 | 2676 | 2 | | | | 70 | | | | | | | |
| Resin 2 | 2704 | 2 | | | | | 70 | | | | | | |
| AgiSyn™ 2020 | 1100 | 2 | | | | | | 70 | | | | | |
| epoxy Soy oil - AA | | | | | | | | | | | | | |
| Resin 3 | 5446 | 4 | | | | | | | 70 | | | | |
| AgiSyn™ 730 | 1500 | 4 | | | | | | | | 70 | | | |
| Polyester acrylate AgiSyn™ 705 | 1300 | 4 | | | | | | | | | 70 | | |
| Polyester acrylate AgiSyn™ 1010 | 500 | 2 | | | | | | | | | | 70 | |
| BADGE-AA novolac epoxy acrylate AgiSyn™ 9760 (50% in TMPTA) | 1500 | 3 | | | | | | | | | | | 42.5 |
| TMP(EO)$_9$TMA (via AgiSyn™ 9760) | 724 | 3 | 15 | 15 | 15 | 15 | 15 | 15 | 15 | 15 | 15 | 15 | 15 |
| TMPTA | 296 | 3 | | | | | | | | | | | 42.5 |
| GPTA | 428 | 3 | 15 | 15 | 15 | 15 | 15 | 15 | 15 | 15 | 15 | 15 | 6.9 |
| Molar A/M ratio in RD | | | 1.7 | 1.7 | 1.7 | 1.7 | 1.7 | 1.7 | 1.7 | 1.7 | 1.7 | 1.7 | |
| Omnirad 1173 | | | 0.15 | 0.15 | 0.15 | 0.15 | 0.15 | 0.15 | 0.15 | 0.15 | 0.15 | 0.15 | 0.15 |
| MBPO | | | 0.50 | 0.50 | 0.50 | 0.50 | 0.50 | 0.50 | 0.50 | 0.50 | 0.50 | 0.50 | 0.50 |
| After UV | | | Wrinkles | Some wrinkles | Some wrinkles | Many wrinkles | Many wrinkles | Many wrinkles | Wet | Smooth | Some wrinkles | Many wrinkles | Many wrinkles |
| Surface | | | Tack free | Tack free | Tack free | Tacky | Tacky | Oily | Wet | Tack free | Tack free | Tacky | Tacky |

TABLE 3-continued

| Resin | F | E2 | E3 | E4 | E5 | E6 | E7 | C7 | C8 | C9 | C10 | C11 |
|---|---|---|---|---|---|---|---|---|---|---|---|---|
| Molar mass | | | | | | | | | | | | |
| Score Final Appearance | | 4 Good | 4 Few cracks | 4 Good | 3 Good | 3 Good | 3 Few spots | 0 Coating sunk in paper | 5 Cracking, blistering, flaking and delamination | 4 Gloss defects | 3 Cracking, blistering, flaking and delamination | 3 Gloss defects |
| Final score | | 5 | 4 | 5 | 5 | 5 | 4 | 0 | 1 | 3 | 1 | 3 |

These results clearly indicate that good final results can only be obtained with resins selected from the group of urethane (meth)acrylates or acrylated epoxidized triglycerides with a molar mass >800 and <4500.

Examples 8-13 and Comparative Experiments C12-C14: Variation in Amount of Reactive Diluents

TABLE 4

| | C12 | E8 | E9 | E10 | E11 | E12 | E13 | C13 | C14 |
|---|---|---|---|---|---|---|---|---|---|
| AgiSyn ™ 670T1 | 90 | 80 | 70 | 60 | 50 | 40 | 30 | 20 | 10 |
| TMP(EO)$_9$TMA | 5 | 10 | 15 | 20 | 25 | 30 | 35 | 40 | 45 |
| GPTA | 5 | 10 | 15 | 20 | 25 | 30 | 35 | 40 | 45 |
| Molar A/M ratio in RD | 1.7 | 1.7 | 1.7 | 1.7 | 1.7 | 1.7 | 1.7 | 1.7 | 1.7 |
| Omnirad 1173 | 0.15 | 0.15 | 0.15 | 0.15 | 0.15 | 0.15 | 0.15 | 0.15 | 0.15 |
| MBPO | 0.50 | 0.50 | 0.50 | 0.50 | 0.50 | 0.50 | 0.50 | 0.50 | 0.50 |
| After UV | Smooth | Smooth | Smooth/ slight wrinkling | Smooth/ slight wrinkling | Slight wrinkling | Slight wrinkling | Slight wrinkling | Slight wrinkling | Slight wrinkling |
| Surface | Tack free | Tack free | Tack free | Tack free | Tack free | Tack free | Tack free | Slight oily | Slight tacky |
| Score | 5 | 5 | 4-5 | 4-5 | 4 | 4 | 4 | 3 | 2 |
| Final Appearance | Some delamination | Good | Good | Good | Good | Some blisters | Some blisters | Some blisters & cracks | Many big and small cracks |
| Final score | 2 | 5 | 5 | 5 | 5 | 4 | 4 | 3 | 1 |

These results clearly indicate that good final results can only be obtained with an amount of reactive diluent of more than 10 wt. % and less than 80 wt. %.

Examples 14-17 and Comparative Experiments C15-C18: Variation in Reactive Diluent Functionality

TABLE 5

| | Molar mass | f | C15 | C16 | E14 | E15 | C17 | C18 | E16 | E17 |
|---|---|---|---|---|---|---|---|---|---|---|
| AgiSyn ™ 670T1 | 1600 | 2 | 70 | 70 | 70 | 70 | 70 | 70 | 70 | 70 |
| BMA | 142 | 1 | | | | | 15 | | | |
| TEGDMA | 286 | 2 | | | | | | 15 | | |
| TMP(EO)$_9$TMA | 724 | 3 | 15 | 15 | 15 | 15 | | | 15 | |
| PTTMA | 610 | 4 | | | | | | | | 15 |
| LA | 240 | 1 | 15 | | | | | | | |
| DPGDA | 242 | 2 | | 15 | | | | | | |
| GPTA | 428 | 3 | | | 15 | | 15 | 15 | 15 | 15 |
| PPTTA | 550 | 4 | | | | 15 | | | | |
| Molar A/M ratio in RD | | | 1.0 | 2.3 | 1.7 | 1.8 | 1.0 | 1.0 | 1.7 | 1.1 |
| Omnirad 1173 | | | 0.15 | 0.15 | 0.15 | 0.15 | 0.15 | 0.15 | 0.15 | 0.15 |
| MBPO | | | 0.50 | 0.50 | 0.50 | 0.50 | 0.50 | 0.50 | 0.50 | 0.50 |
| After UV | | | Wet | Slight wrinkling | Slight wrinkling | Smooth | Wet | Wet | Slight wrinkling | Smooth |
| Surface | | | Wet | Slight tacky | Tack free | Tack free | Wet | Wet | Tack free | Tack free |
| Score | | | 0 | 3 | 4 | 5 | 0 | 0 | 4 | 5 |
| Final Appearance | | | Coating sunk in paper | Big blisters | Good | Good | Coating sunk in paper | Coating sunk in paper | Good | Good |
| Final score | | | 0 | 2 | 5 | 5 | 0 | 0 | 5 | 5 |

These results clearly indicate that good final results can only be obtained with reactive diluents having an average functionality higher than 2 both for the methacrylate as well as the acrylate.

Examples 18-21 and Comparative Experiments
C19-C20: Variation in Molar A/M Ratio in
Reactive Diluent

TABLE 6

| | Molar mass | f | C19 | E18 | E19 | E20 | E21 | C20 |
|---|---|---|---|---|---|---|---|---|
| AgiSyn ™ 670T1 | 1600 | 2 | 70 | 70 | 70 | 70 | 70 | 70 |
| TMP(EO)$_9$TMA | 724 | 3 | 30 | 25 | 20 | 15 | 10 | 0 |
| GPTA | 428 | 3 | 0 | 5 | 10 | 15 | 20 | 30 |
| Molar A/M ratio in RD | | | 0 | 0.3 | 0.8 | 1.7 | 3.4 | NA |
| Omnirad 1173 | | | 0.15 | 0.15 | 0.15 | 0.15 | 0.15 | 0.15 |
| MBPO | | | 0.50 | 0.50 | 0.50 | 0.50 | 0.50 | 0.50 |
| After UV | | | Slight wrinkling | Slight wrinkling | Slight wrinkling | Slight wrinkling | Slight wrinkling | Smooth |
| Surface | | | Tack free | Tack free | Tack free | Tack free | Tack free | Tack free |
| Score | | | 4 | 4 | 4 | 4 | 4 | 5 |
| Final Appearance | | | Slight delamination | Good | Good | Good | Good | Cracking, blistering, flaking and delamination |
| Final score | | | 3 | 5 | 5 | 5 | 5 | 1 |

These results clearly indicate that good final results can only be obtained when the molar ratio of acrylate functionalities and methacrylate functionalities in the reactive diluent is higher than 0.2.

Examples 22-24 and Comparative Experiments
C21-C22: Variation in Photo-Initiator

TABLE 7

| | Molar mass | f | E22 | E23 | E24 | C21 | C22 |
|---|---|---|---|---|---|---|---|
| AgiSyn ™ 670T1 | 1600 | 2 | 70 | 70 | 70 | 70 | 70 |
| TMP(EO)$_9$TMA | 724 | 3 | 15 | 15 | 15 | 15 | 15 |
| GPTA | 428 | 3 | 15 | 15 | 15 | 15 | 15 |
| Molar A/M ratio in RD | | | 1.7 | 1.7 | 1.7 | 1.7 | 1.7 |
| Omnirad 1173 | | | 0.15 | | | 0.15 | — |
| Omnirad TPO-L | | | | 0.15 | | | — |
| Omnirad BP | | | | | 0.15 | | |
| AgiSyn ™ 002 | | | | | 0.50 | | |
| MBPO | | | 0.50 | 0.50 | 0.50 | — | 0.50 |
| After UV | | | Slight wrinkling | Slight wrinkling | Slight wrinkling | Slight wrinkling | Wet |
| Surface | | | Tack free | Tack free | Tack free | Tack free | Wet |
| Score | | | 4 | 4 | 4 | 4 | 0 |
| Final Appearance | | | Good | Good | Good | Cracking, blistering, flaking and complete delamination | Coating sunk in paper |
| Final score | | | 5 | 5 | 5 | 0 | 0 |

These results clearly indicate that good final results can only be obtained when both a photo and a thermal initiator are present. Furthermore these results show that various photoinitiators can be used.

Examples 25-29: Variation in Thermal Initiator

TABLE 8

| | | Molar mass | f | E25 | E26 | E27 | E28 | E29 |
|---|---|---|---|---|---|---|---|---|
| NeoRad ™ U-25 (neat) | UA | 1300 | 2 | 40 | 40 | 40 | 40 | 40 |
| NeoRad ™ P-11 | PE | 750 | 3 | 20 | 20 | 20 | 20 | 20 |
| TMP(EO)$_9$TMA | | 724 | 3 | 15 | 15 | 15 | 15 | 15 |
| DPGDA | | 214 | 2 | 10 | 10 | 10 | 10 | 10 |
| GPTA | | 428 | 3 | 15 | 15 | 15 | 15 | |
| PPTTA | | 550 | 4 | | | | | 15 |
| Molar A/M ratio in RD | | | | 4.5 | 4.5 | 4.5 | 4.5 | 4.5 |

TABLE 8-continued

| | Molar mass | f | E25 | E26 | E27 | E28 | E29 |
|---|---|---|---|---|---|---|---|
| Omnirad 1173 | | | 0.15 | 0.15 | 0.15 | 0.15 | 0.15 |
| MBPO | | | 0.50 | | | | 0.50 |
| LPO | | | | 0.50 | | | |
| TBPEH | | | | | 0.50 | | |
| TAPEH | | | | | | 0.50 | |
| TBH | | | | | | | |
| After UV | | | Some wrinkles | Some wrinkles | Some wrinkles | Some wrinkles | Slight wrinkles |
| Surface | | | Tack free | Tack free | Tack free | Tack free | Tack free |
| Score | | | 4 | 4 | 4 | 4 | 4 |
| Final Appearance | | | Good | Good | Good | Good | Good |
| Final score | | | 5 | 5 | 5 | 5 | 5 |

Neorad ™ P-11 with an molar mass according to the brochure of 750 is here considered an acrylate functional reactive diluent. These results show that various peroxides can be used.

Examples 30-33 and Comparative Experiments C23-C27: Variation in Reactive Diluent

TABLE 9

| | C23 | C24 | E30 | E31 | C25 | C26 | C27 | E32 | E33 |
|---|---|---|---|---|---|---|---|---|---|
| AgiSyn ™ 705 | 20 | 20 | 20 | 20 | 20 | 20 | 20 | 20 | 20 |
| Resin | 16.8 | 16.8 | 16.8 | 16.8 | 16.8 | 16.8 | 16.8 | 16.8 | 16.8 |
| Tris (2-hydroxy ethyl) isocyanurate triacrylate | 3.2 | 3.2 | 3.2 | 3.2 | 3.2 | 3.2 | 3.2 | 3.2 | 3.2 |
| AgiSyn ™ 670T1 | 50 | 50 | 50 | 50 | 50 | 50 | 50 | 50 | 50 |
| BMA | | | | | | 15 | | | |
| TEGDMA | | | | | | | 15 | | |
| TMPTMA9EO | 30 | 15 | 15 | 15 | | | | 15 | |
| PPTTMA | | | | | | | | | 15 |
| LA | | 15 | | | | | | | |
| DPGDA | | | 15 | | | | | | |
| GPTA | | | | 15 | 30 | 15 | 15 | 15 | 15 |
| average methacrylate functionality RD | 3 | 3 | 3 | 3 | | 1 | 2 | 3 | 4 |
| average acrylate functionality RD | 3 | 1.2 | 2.1 | 3 | 3 | 3 | 3 | 3 | 3 |
| Molar A/M ratio in RD | 0.18 | 1.4 | 2.6 | 2.1 | | 1.2 | 1.2 | 2.1 | 1.3 |
| Omnirad 1173 | 0.15 | 0.15 | 0.15 | 0.15 | 0.15 | 0.15 | 0.15 | 0.15 | 0.15 |
| MBPO | 0.5 | 0.5 | 0.5 | 0.5 | 0.5 | 0.5 | 0.5 | 0.5 | 0.5 |
| After UV | Slight wrinkling | Slight wrinkling | Some wrinkles | Some wrinkles | Some wrinkles | Wet | Slight wrinkling | Some wrinkles | Some wrinkles |
| Surface | Slight tacky | Slight tacky | Tack free | Tack free | Tack free | Wet | Slight tacky | Tack free | Tack free |
| Score | 3 | 3 | 4 | 4 | 4 | 1 | 3 | 4 | 4 |
| Final Appearance | Cracking | Coating sunk in paper | Some irregular gloss | Very few blisters | Cracking | Coating sunk in paper | Coating sunk in paper | Very few blisters | Very few blisters |
| Final score | 2-3 | 0 | 4 | 4 | 2-3 | 0 | 0 | 4 | 4 |

According to the MSDS AgiSyn ™ 705 contains on average 16 wt. % of tris (2-hydroxy ethyl) isocyanurate triacrylate which is an acrylate reactive diluent with a molar mass of 261 g/mol. These examples show that an average acrylate functionality of the reactive diluents RD of 2.1 is already sufficient for obtaining a good performance.

Examples 34-38 and Comparative Experiments C30-C31: Variation in Average (Meth)Acrylate Functionalities

TABLE 10

|  | C30 | E34 | E35 | E36 | C31 | E37 | E38 |
|---|---|---|---|---|---|---|---|
| AgiSyn ™ 670T1 | 70 | 70 | 70 | 70 | 70 | 70 | 70 |
| TEGDMA |  |  |  |  | 15 | 5 | 0 |
| TMPTMA 9EO | 15 | 15 | 15 | 15 | 0 | 10 | 15 |
| DPGDA | 15 | 10 | 5 | 0 |  |  |  |
| GPTA | 0 | 5 | 10 | 15 | 15 | 15 | 15 |
| Average methacrylate functionality in RD | 3 | 3 | 3 | 3 | 2 | 2.4 | 3 |
| Average acrylate functionality in RD | 2 | 2.2 | 2.5 | 3 | 3 | 3 | 3 |
| Molar A/M ratio in RD | 2.3 | 2.1 | 1.9 | 1.7 | 1.0 | 1.4 | 1.7 |
| Omnirad 1173 | 0.15 | 0.15 | 0.15 | 0.15 | 0.15 | 0.15 | 0.15 |
| MBPO | 0.5 | 0.5 | 0.5 | 0.5 | 0.5 | 0.5 | 0.5 |
| After UV | Slight wrinkling | Some wrinkles | Some wrinkles | Some wrinkles | Wet | Some wrinkles | Some wrinkles |
| Surface | Slight tacky | Tack free | Tack free | Tack free | Wet | Tack free | Tack free |
| Score | 3 | 4 | 4 | 4 | 0 | 4 | 4 |
| Final Appearance | Blisters | Very few blisters | Very few blisters | Very few blisters | Coating sunk in paper | Few Blisters | Very few blisters |
| Final score | 2-3 | 4 | 4 | 4 | 0 | 4 | 4 |

Table 9 combined with table 10 again shows that an average acrylate functionality of the reactive diluents of 2.1 is already sufficient for a good performance. Regarding the average methacrylate functionality of the reactive diluents it is preferably higher than 2.4.

Examples 39-44: Variation in Average UV Dose

TABLE 11

|  | E39 | E40 | E41 | E42 | E42 | E44 |
|---|---|---|---|---|---|---|
| AgiSyn ™ 705 | 20 | 20 | 20 | 20 | 20 | 20 |
| AgiSyn ™ 670T1 | 50 | 50 | 50 | 50 | 50 | 50 |
| TMPTMA 9EO | 15 | 15 | 15 | 15 | 15 | 15 |
| GPTA | 15 | 15 | 15 | 15 | 15 | 15 |
| Omnirad 1173 | 0.15 | 0.15 | 0.15 | 0.15 | 0.15 | 0.15 |
| MBPO | 0.5 | 0.5 | 0.5 | 0.5 | 0.5 | 0.5 |
| Belt Speed (m/min) (UV dose, J/cm2) | 60 (0.086) | 50 (0.3) | 40 (0.52) | 30 (0.73) | 20 (0.95) | 10 (1.1) |
| After UV | Some wrinkles | Some wrinkles | Some wrinkles | Some wrinkles | Smooth | Smooth |
| Surface | Tack free | Tack free | Tack free | Tack free | Tack free | Tack free |
| Score | 4 | 4 | 4 | 4 | 5 | 5 |
| Final Appearance | Very few blisters | Very few blisters | Very few blisters | Good | Good | Good |
| Final score | 4 | 4 | 4 | 5 | 5 | 5 |

By varying the belt speed from 60 m/min down to 10 m/min the UV dose was increased from around 90 mJ/cm$^2$ up to 1.1 J/cm$^2$. As can be seen from these examples a good result (i.e. score 4-5) is obtained irrespective of the UV dose, hence the UV dose is not critical. Although at a dose around 90 mJ/cm$^2$ good results are obtained, for obtaining the best result a higher dose, like for example a UV dose ≥0.6 J/cm$^2$ is used. The coating of example 39 was also assessed for coffee resistance (2 h) according to EN423 with a coffee spot exposure of 2 hours and scratch resistance according to ISO 15184. After having performed the UV cure but prior to the thermal cure, the coffee resistance (2 h) was assessed with a score of 1 and the scratch resistance was assessed with a score of 5 B. The coffee resistance (2 h) of the final coating that was obtained after the thermal cure was assessed with a score of 4 and the scratch resistance was rated F. For the visual assessed coffee resistance, a score of from 1 to 5 is given, whereby a rating of 5 is the best and a rating of 1 is the worst.

Photos of the coated panels of Example 39 have been taken, see FIGS. 1 and 2.

Figure 1:
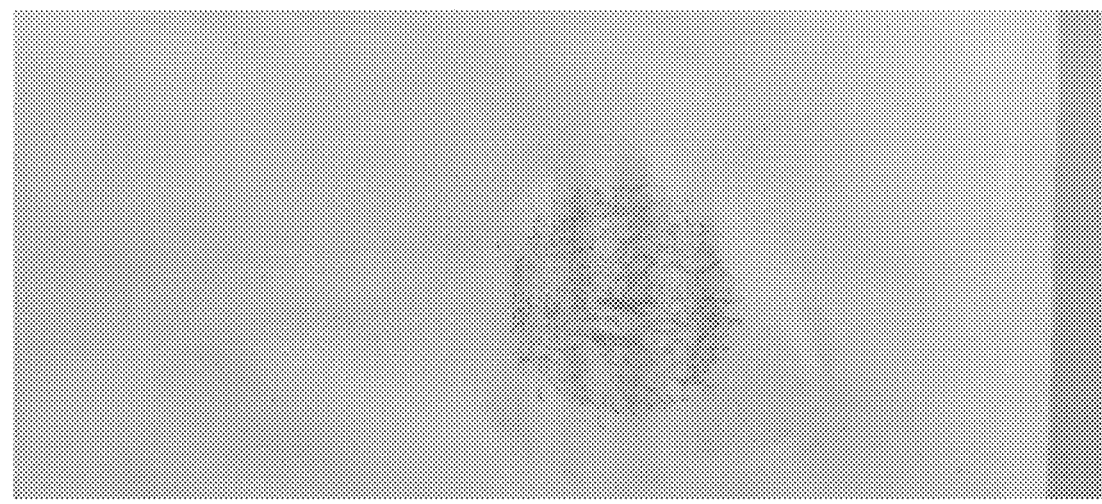
FIG. 1 shows the coffee stain on the coating that has been obtained after the UV cure but prior to the thermal cure. The visual assessed coffee resistance rating was 1.
Figure 2:
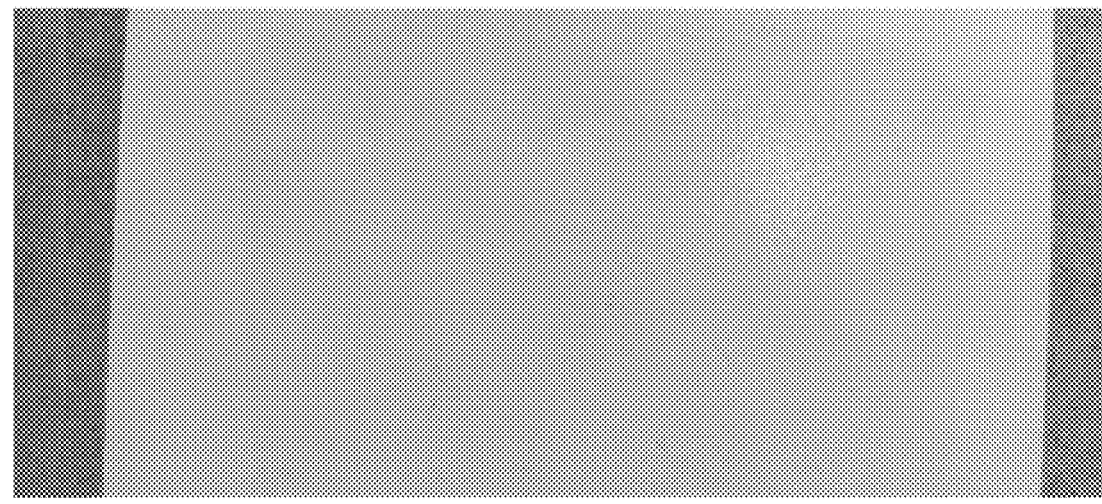
FIG. 2 shows the coffee stain on the final coating that was obtained after the thermal cure.

The visual assessed coffee resistance rating was 4.

The invention claimed is:

1. A radical curable coating composition comprising:
   (A) one or more oligomers selected from the group consisting of urethane (meth)acrylates, (meth)acrylated epoxidized triglycerides and any mixture thereof, wherein said oligomers have a molar mass equal to or higher than 800 g/mol and lower than 4500 g/mol, (B) one or more methacrylate reactive diluents having a molar mass lower than 800 g/mol, wherein said methacrylate reactive diluents have an average methacrylate functionality higher than 2, (C) one or more acrylate reactive diluents having a molar mass lower than 800 g/mol, wherein said acrylate reactive diluents have an average acrylate functionality higher than 2, (D) one or more photo-initiators, and (E) one or more thermal initiators, wherein the acrylate functionalities of the acrylate reactive diluents (C) and the methacrylate functionalities of the methacrylate reactive diluents (B) are present in a molar ratio of the acrylate functionalities to the methacrylate functionalities of at least 0.2, wherein the amount of oligomers (A) is higher than 20 wt. % and lower than 90 wt. % and the amount of reactive diluents (B) and (C) is higher than 10 wt. % and lower than 80 wt. %, based on the total amount of (A), (B) and (C), and wherein the total amount of (A), (B) and (C) is at least 25 wt. % of the radical-curable coating composition.

2. The composition according to claim 1, wherein said one or more oligomers (A) are urethane (meth)acrylates with a molar mass higher than 850 g/mol and lower than 3500 g/mol.

3. The composition according to claim 1, wherein said acrylate reactive diluents (C) and said methacrylate reactive diluents (B) are present in a weight ratio of the acrylate reactive diluents (C) to the methacrylate reactive diluents (B) of from 0.1 to 5.

4. The composition according to claim 1, wherein the acrylate functionalities of the acrylate reactive diluents (C) and the methacrylate functionalities of the methacrylate reactive diluents (B) are present in a molar ratio of the acrylate functionalities to the methacrylate functionalities of at least 0.3.

5. The composition according to claim 1, wherein the average methacrylate functionality of the reactive diluents (B) is higher than 2.4.

6. The composition according to claim 1, wherein the average acrylate functionality of the acrylate reactive diluents (C) is higher than 2.05.

7. The composition according to claim 1, wherein said one or more oligomers (A) are present in an amount of at least 25 wt. % at most 85 wt. %, based on the total amount of (A), (B) and (C) and said one or more reactive diluents (B) and (C) are present in an amount of at least 15 wt. % and at most 75 wt. % based on the total amount of (A), (B) and (C).

8. The composition according to claim 1, wherein the total amount of (A), (B) and (C) is at least 40 wt. % by weight of the radical-curable coating composition.

9. The composition according to claim 1, wherein the one or more photo-initiators are α-cleavage photo-initiators.

10. The composition according to claim 1, wherein the one or more thermal initiators are selected from the group consisting of free radical thermal initiator having a 0.1 hour half-life temperature of at least 70° C.

11. The composition according to claim 1, wherein the one or more thermal initiators are selected from the group consisting of free radical thermal initiators having a maximum storage temperature of at least 5° C.

12. The composition according to claim 1, wherein the one or more thermal initiators are selected from the group consisting of peresters, monopercarbonates, peranhydrides or any mixture thereof.

13. The composition according to claim 1, wherein the composition further comprises one or more inhibitors selected from the group consisting of hydroquinones, phenols, catechols, benzoquinones, orthoquinones and mixtures thereof.

14. A method for obtaining a coated substrate, comprising:

(1) providing a substrate having a major surface, (2) applying the coating composition as defined in claim 1 on at least a portion of the major surface of the substrate, and (3) photo-curing the coating composition to obtain a substrate with a partially cured coating, and (4) thermally curing the partially cured coating to obtain the coated substrate.

15. The method according to claim 14, wherein the coated substrate is a coated panel.

16. A coated substrate obtained with the method according to claim 14.

17. The composition according to claim 1, wherein said acrylate reactive diluents (C) and said methacrylate reactive diluents (B) are present in a weight ratio of the acrylate reactive diluents (C) to the methacrylate reactive diluents (B) of from 0.4 to 3.5.

18. The composition according to claim 1, wherein the acrylate functionalities of the acrylate reactive diluents (C) and the methacrylate functionalities of the methacrylate reactive diluents (B) are present in a molar ratio of the acrylate functionalities to the methacrylate functionalities of at most 6.

19. The composition according to claim 1, wherein the average methacrylate functionality of the reactive diluents (B) is higher than 2.6.

20. The composition according to claim 1, wherein the average acrylate functionality of the acrylate reactive diluents (C) is higher than 2.2.

* * * * *